US012626349B2

(12) United States Patent
Mussi Toschi et al.

(10) Patent No.: US 12,626,349 B2
(45) Date of Patent: May 12, 2026

(54) ENHANCED IMAGING ANALYSIS FOR THREE-DIMENSIONAL SCAN ACQUISITION AND FIBER/WIRE SEPARATION

(71) Applicant: Schlumberger Technology Corporation, Sugar Land, TX (US)

(72) Inventors: Vitoria Mussi Toschi, Clamart (FR); Guillaume Deville, Clamart (FR); David Thuilliez, Clamart (FR); Amal Krimi, Clamart (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 397 days.

(21) Appl. No.: 18/447,601

(22) Filed: Aug. 10, 2023

(65) Prior Publication Data

US 2025/0054125 A1    Feb. 13, 2025

(51) Int. Cl.
*G06T 7/00*         (2017.01)

(52) U.S. Cl.
CPC .. *G06T 7/0004* (2013.01); *G06T 2207/10028* (2013.01); *G06T 2207/30136* (2013.01); *G06T 2207/30141* (2013.01); *G06T 2207/30152* (2013.01)

(58) Field of Classification Search
CPC ......... G06T 7/0004; G06T 2207/10028; G06T 2207/30136; G06T 2207/30141; G06T 2207/30152; G06T 2207/10072; G06T 2207/30108; G06T 7/60; G01N 23/04; G01N 23/046; G01N 2223/1016; G01N 2223/401; G01N 23/18; H01M 10/0409; H01M 10/0431; H01M 10/48
USPC .................................................. 382/100, 141
See application file for complete search history.

(56) References Cited

U.S. PATENT DOCUMENTS

| | | | | |
|---|---|---|---|---|
| 8,059,874 B2* | 11/2011 | Pfister | .................. | G06T 11/006 |
| | | | | 382/128 |
| 8,414,993 B2* | 4/2013 | Nakazono | .............. | G02B 1/105 |
| | | | | 428/137 |
| 10,572,987 B2* | 2/2020 | Bartscher | .............. | G06T 7/0006 |
| 2020/0348242 A1* | 11/2020 | Watanabe | .............. | G01N 23/18 |
| 2023/0192438 A1* | 6/2023 | Cenni | ................ | B65H 54/2878 |
| | | | | 242/370 |

FOREIGN PATENT DOCUMENTS

| | | | | |
|---|---|---|---|---|
| CN | 114976338 A | | 8/2022 | |
| JP | H09276932 | * | 10/1997 | |
| JP | H09276932 A | * | 10/1997 | ............. C03B 37/12 |
| WO | 2019157486 A1 | | 8/2019 | |
| WO | 2021168400 A1 | | 8/2021 | |
| WO | 2023050065 A1 | | 4/2023 | |

* cited by examiner

*Primary Examiner* — Sheela C Chawan

(74) *Attorney, Agent, or Firm* — Kyle R. Miller

(57) ABSTRACT

Embodiments presented provide for analysis of three-dimensional bodies through a scan that allows researchers to identify fiber or wire separation by using a merged data set.

20 Claims, 12 Drawing Sheets

ENHANCED IMAGING ANALYSIS FOR THREE-DIMENSIONAL SCAN ACQUISITION AND FIBER/WIRE SEPARATION

CROSS-REFERENCE TO RELATED APPLICATIONS

None.

FIELD OF THE DISCLOSURE

Aspects of the disclosure relate to analysis of three-dimensional images. More specifically, aspects of the disclosure provide an enhanced imaging analysis for three-dimensional scan acquisition and fiber/wire separation.

BACKGROUND

Fiber and/or wire three-dimensional image acquisition, separation and analysis in multiple electronic components is critical to ensure their reliability and the related failure analysis. The identification of failures and risks in electronic components with a complex three-dimensional structure and high density, such as transformers, is a challenging task. The acquisition of three-dimensional X-Ray images with high signal over noise ratios and their subsequent analysis, including fiber identification or separation is essential to allow these failure and risk analysis.

The failure analyses allow precise identification of defects, artefacts, and process indicators, such as short-circuits, solder balls, and other metallic residues, as well as enamel wire overlapping, etc. The results of the failure analyses are then used to implement preventive or corrective actions, either at the component design specification level or on the manufacturing and assembly process.

Conventional methods for analysis generally do not have sufficient image quality. Such images; furthermore, have noises inherent in the images and there is no method or algorithm for separating and analyzing the wires and/or fibers in components within complex three-dimensional structures.

While the use of three-dimensional X-Ray images in the electronics industry is becoming a standard process, the methods used have many drawbacks. For example, data acquisition still has limitations linked with the mild signal over noise ratio for some heavy components and with the image post-processing methods, especially in components with a complex three-dimensional structure.

Currently, there is no reliable and repeatable method for three-dimensional X-Ray image acquisition improvement for high density and highly complex parts. For three-dimensional parts, there are only empiric and unprecise methods for image post-processing for fiber and/or wire separation.

There is a need to provide an apparatus and methods that are easier to operate than conventional apparatus and methods and that provide for analysis of complex three-dimensional components.

There is a further need to provide apparatus and methods that do not have the drawbacks discussed above, namely, use of empirical methods that are imprecise for highly detailed parts used in industry.

There is a still further need to provide a method for analysis of three-dimensional structures that is cost effective as well as precise and quick.

SUMMARY

So that the manner in which the above recited features of the present disclosure can be understood in detail, a more particular description of the disclosure, briefly summarized below, may be had by reference to embodiments, some of which are illustrated in the drawings. It is to be noted that the drawings illustrate only typical embodiments of this disclosure and are therefore not to be considered limiting of its scope, for the disclosure may admit to other equally effective embodiments without specific recitation. Accordingly, the following summary provides just a few aspects of the description and should not be used to limit the described embodiments to a single concept.

In one embodiment, a method for analysis of a three-dimensional scan is disclosed. The method may comprise importing two volumes and reference points with perpendicular acquisition orientations, each of the two volumes and reference points having discrete data sets. The method may comprise determining surfaces of the two volumes. The method may further comprise making a selection of markers on each of the two volumes. The method may comprise aligning the two volumes based upon the positioning of the markers. The method may further comprise measuring distances between markers on each of the two volumes. The method may further comprise normalizing the measured distances between the markers. The method may further comprise updating the aligning of the two volumes based upon the normalized measured distances between the markers and updating the data sets. The method may further comprise merging the data sets to achieve a single data set. The method may further comprise sampling the single data set. The method may further comprise determining an orientation and correlation information of wires and plotting a position of the wires. The method may further comprise determining a winding direction of the wires for the single data set. The method may further comprise determining separated structures for the single set.

In another example embodiment, an article of manufacture comprising a non-volatile memory with a set of instructions incorporated onto the non-volatile memory configured to be read by a computer. The set of instructions may include a method for analysis of a three-dimensional scan. The method on the set of instructions may comprise importing two volumes and reference points with perpendicular acquisition orientations, each of the two volumes and reference points having discrete data sets. The method on the set of instructions may comprise determining surfaces of the two volumes. The method on the set of instructions may comprise making a selection of markers on each of the two volumes. The method on the set of instructions may comprise aligning the two volumes based upon the positioning of the markers. The method on the set of instructions may comprise measuring distances between markers on each of the two volumes. The method on the set of instructions may comprise normalizing the measured distances between the markers. The method on the set of instructions may further comprise updating the aligning of the two volumes based upon the normalized measured distances between the markers and updating the data sets. The method on the set of instructions may further comprise merging the data sets to achieve a single data set. The method on the set of instructions may further comprise sampling the single data set. The method on the set of instructions may further comprise determining an orientation and correlation information of wires and plotting a position of the wires. The method on the set of instructions may further comprise determining a winding direction of the wires for the single data set. The method on the set of instructions may further comprise determining separated structures for the single set.

In another example embodiment, a method may comprise performing two three-dimensional scans of an object, each of the scans in a perpendicular acquisition orientation and each scan having discrete data sets, the scans defining two volumes. The method may also comprise determining surfaces of the two volumes. The method may also comprise making a selection of markers on each of the two volumes. The method may also comprise aligning the two volumes based upon the positioning of the markers. The method may also comprise measuring distances between markers on each of the two volumes. The method may also comprise normalizing the measured distances between the markers. The method may also comprise updating the aligning of the two volumes based upon the normalized measured distances between the markers and updating the data sets. The method may also comprise merging the data sets to achieve a single data set. The method may also comprise sampling the single data set. The method may also comprise determining an orientation and correlation information of wires and plotting a position of the wires. The method may also comprise determining a winding direction of the wires for the single data set. The method may also comprise determining separated structures for the single data set.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the drawings. It is to be noted; however, that the appended drawings illustrate only typical embodiments of this disclosure and are; therefore, not be considered limiting of its scope, for the disclosure may admit to other equally effective embodiments.

Figure 1:
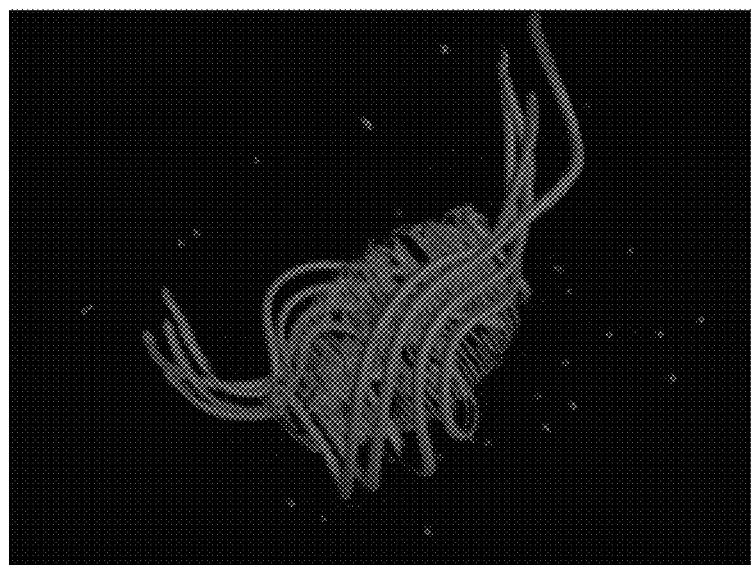
FIG. 1 is depiction of two separate acquisition volumes with different orientations.
Figure 1:
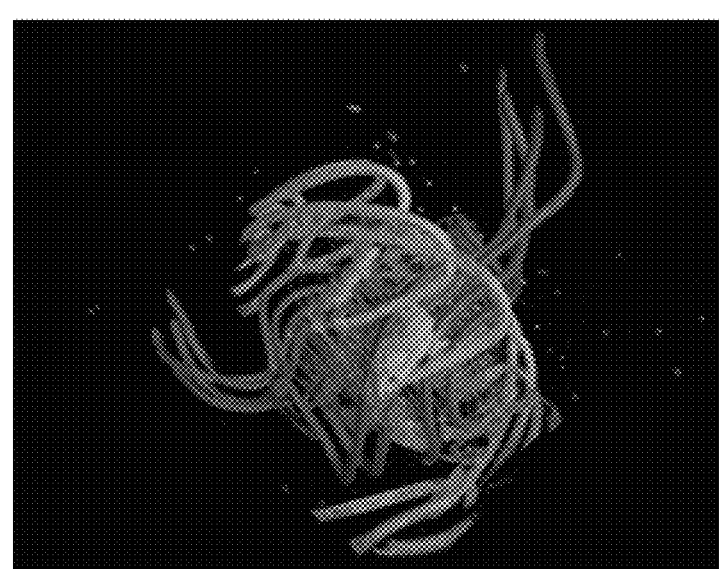

To facilitate understanding, identical reference numerals have been used, where possible, to designate identical elements that are common to the figures ("FIGS."). It is contemplated that elements disclosed in one embodiment may be beneficially utilized on other embodiments without specific recitation.

DETAILED DESCRIPTION

In the following, reference is made to embodiments of the disclosure. It should be understood, however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the claims except where explicitly recited in a claim. Likewise, reference to "the disclosure" shall not be construed as a generalization of inventive subject matter disclosed herein and should not be considered to be an element or limitation of the claims except where explicitly recited in a claim.

Although the terms first, second, third, etc., may be used herein to describe various elements, components, regions, layers and/or sections, these elements, components, regions, layers and/or sections should not be limited by these terms. These terms may be only used to distinguish one element, components, region, layer or section from another region, layer or section. Terms such as "first", "second" and other numerical terms, when used herein, do not imply a sequence or order unless clearly indicated by the context. Thus, a first element, component, region, layer or section discussed herein could be termed a second element, component, region, layer or section without departing from the teachings of the example embodiments.

When an element or layer is referred to as being "on," "engaged to," "connected to," or "coupled to" another element or layer, it may be directly on, engaged, connected, coupled to the other element or layer, or interleaving elements or layers may be present. In contrast, when an element is referred to as being "directly on," "directly engaged to," "directly connected to," or "directly coupled to" another element or layer, there may be no interleaving elements or layers present. Other words used to describe the relationship between elements should be interpreted in a like fashion. As used herein, the term "and/or" includes any and all combinations of one or more of the associated listed terms.

Some embodiments will now be described with reference to the figures. Like elements in the various figures will be referenced with like numbers for consistency. In the following description, numerous details are set forth to provide an understanding of various embodiments and/or features. It will be understood; however, by those skilled in the art, that some embodiments may be practiced without many of these details, and that numerous variations or modifications from the described embodiments are possible. As used herein, the terms "above" and "below", "up" and "down", "upper" and "lower", "upwardly" and "downwardly", and other like terms indicating relative positions above or below a given point are used in this description to more clearly describe certain embodiments.

Figure 2:
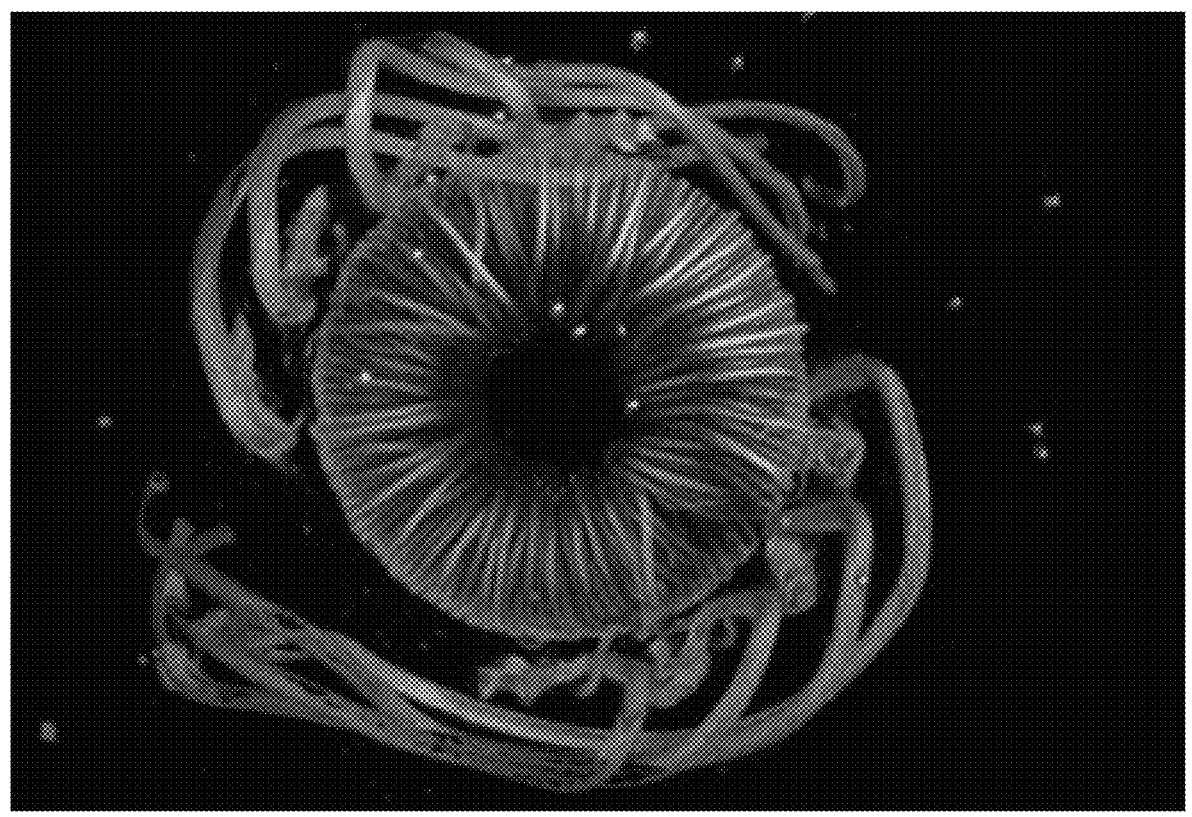
FIG. 2 is depiction of the two separate acquisition volumes in an aligned orientation.

Embodiments of the disclosure provide for an enhanced image analysis for three-dimensional scans. This enhanced image analysis can provide researchers with data related to wire or fiber separation or defect based upon the three-dimensional scan. Referring to FIGS. 1 and 2, a first step of the method involves importing two volumes and reference points with perpendicular acquisition orientations. In FIG. 1, a first volume is established by conducting a three-dimensional scan on an object. In this instance, the volume is of a core winding. Such core windings are present, for example, in electronic components. For the winding to accomplish its intended objective, it is desired that the winding contain a tightly wrapped, single strand of conductive material around a central core. For example, the single strand may be made of a copper or copper alloy material. In this embodiment, a second scan is also accomplished of the winding as presented in FIG. 2. In these two scans, the orientation between the two scans is perpendicular or 90 degrees offset. In embodiments of the disclosure, orientation marks may be used on the winding scans. The surfaces of the scans may be detailed to sufficiently identify surfaces or surface features of the windings. This may include, as illustrated, being able to identify individual fibers or wire strands that extend over the surface.

After determining the surfaces of the two scans, as illustrated in FIG. 1 and FIG. 2, a selection of fiducial markers, represented as geometric elements, is made on both volumes to serve as reference points for an alignment process. To achieve this, an alignment method based on these selected markers is applied, enabling accurate and automated correlation of the three-dimensional scanning data captured.

Figure 3:
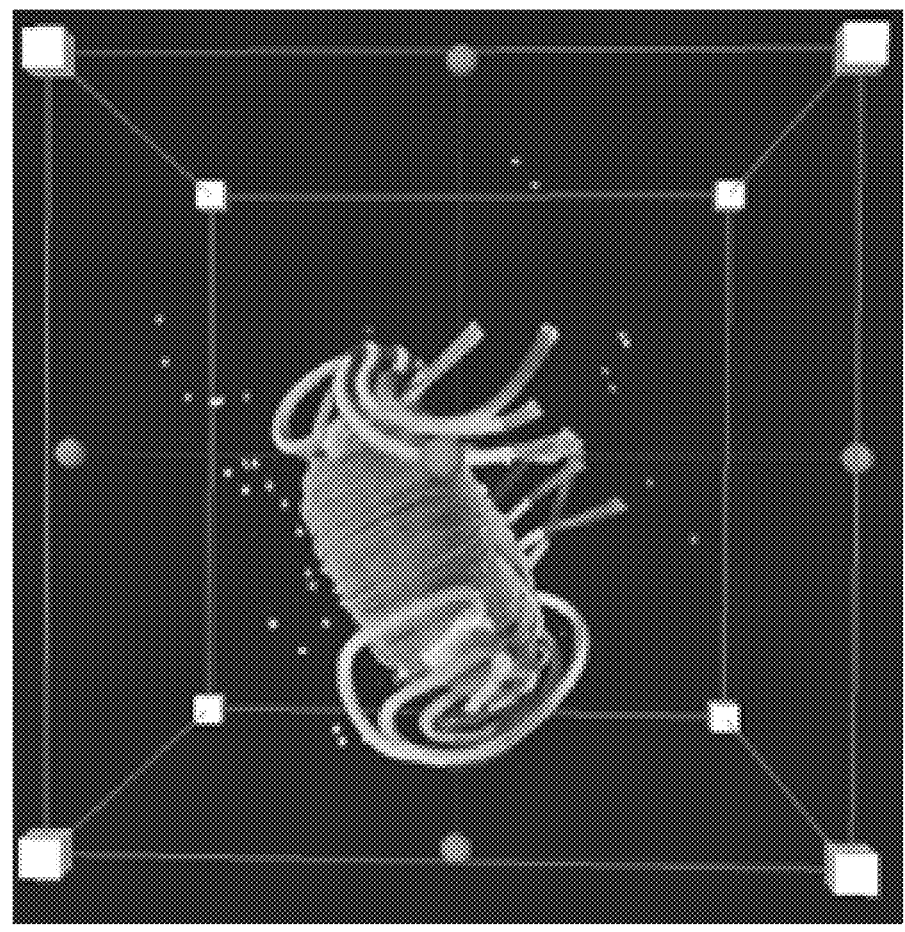
FIG. 3 is three-dimensional rendering of the aligned orientation of FIG. 2.

In embodiments, distances between the markers of the two volumes are normalized, and the alignment is updated to achieve precise and proper superposition of the two volumes. Such an alignment is shown in FIG. 3.

Figure 4:
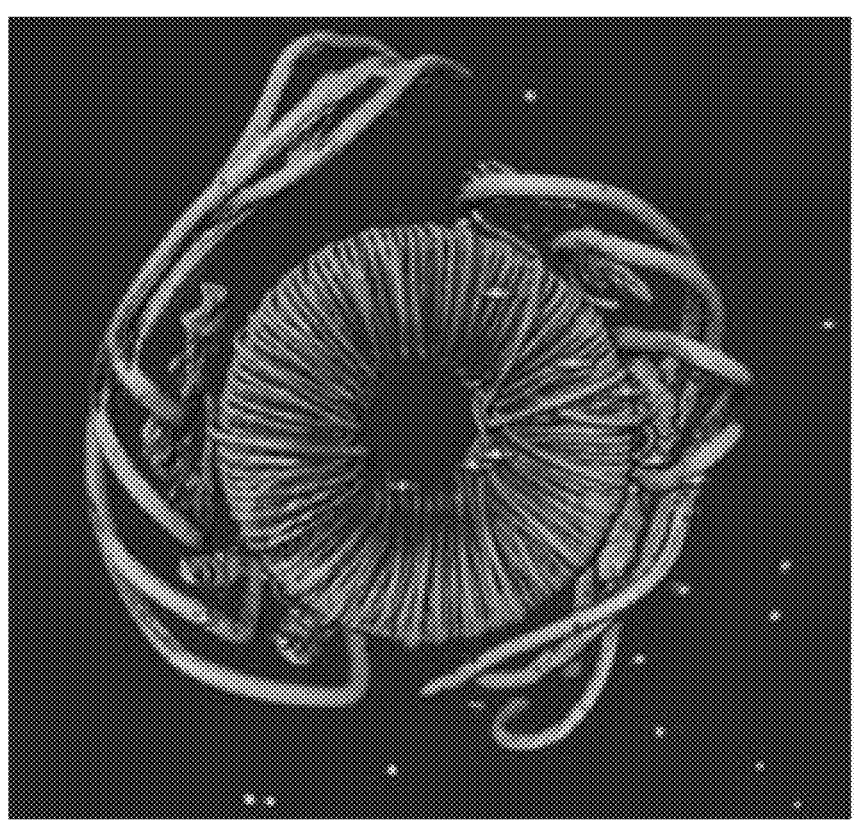
FIG. 4 is depiction of merging of the data sets previously aligned from FIG. 3.

Next, the method includes merging of the data sets from the two volumes previously aligned, allowing for complete analysis and visualization. Referring to FIG. 4, a merger of the aligned datasets has occurred. The reference dataset and the aligned dataset are merged into a unified dataset, resulting from the fusion of the two volumes. The result is then resampled to adjust the resolution and obtain an accurate representation of the complex component with higher signal over noise ratio on the entire component structure.

Figure 5:
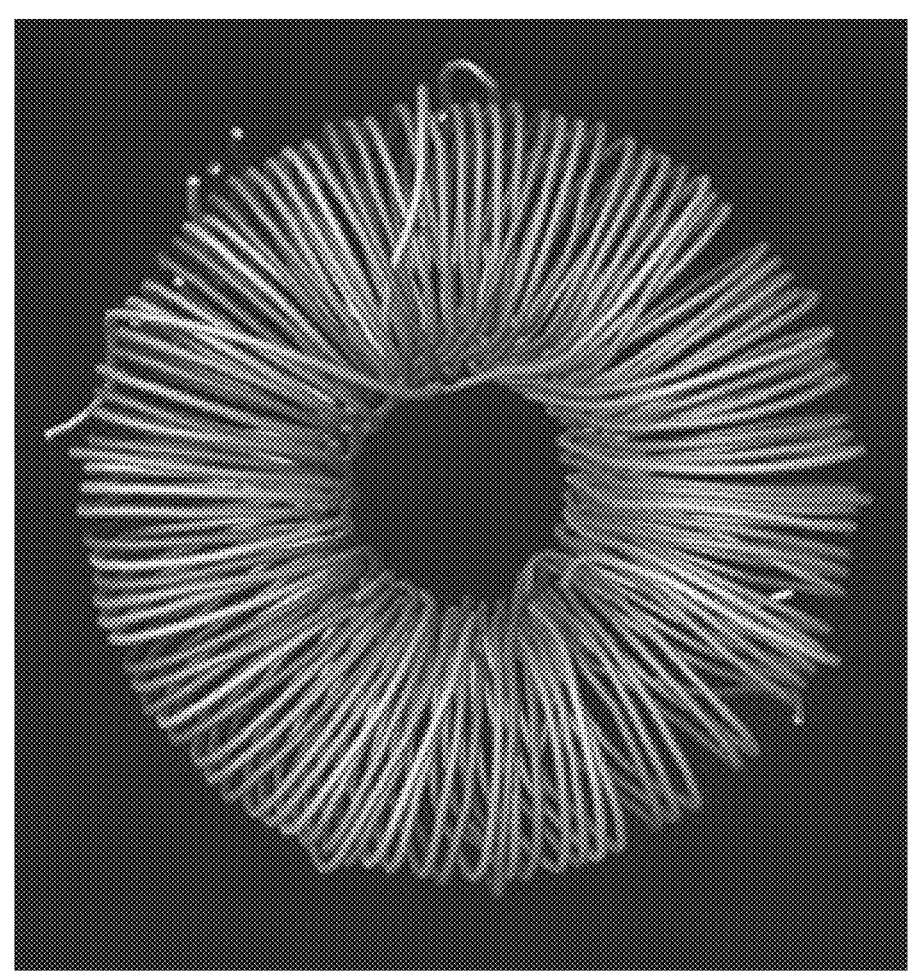
FIG. 5 is depiction of winding detected from the result of FIG. 4.

The orientation and correlation information of the wires are extracted and used to plot the wires of the components, such as transformer windings shown in FIG. 5. To achieve this, the analysis is based on the calculation of correlation measurements and orientation values of the wires/fibers, considering specific parameters such as the radius of the cylinder.

Next, winding detection is accomplished with the merged data. Through this step, the quality of the three-dimensional images is improved by selecting two perpendicular scanning axes and by reconstructing the final image with improved signal over noise ratio. It allows to better separate the fibers and/or wires present on the component, even for dense components, complex structured components and for wires/fibers composed of the same material as other component's structures, such as the lead frame.

In embodiments, the separated structures serve as an indicator of the presence of failures, and it can also give the structure and the parameters of the individual wires/fibers, to be used for mechanical or thermal simulation purposes and for construction analysis (weight, size, density, wire gauge, and length).

The analysis of the distinct structures resulting from the alignment and merging process of two differently oriented scans provides a more reliable and efficient process to analyze transformers and other highly complex or dense components, contributing to its overall mean time between failure and efficiency. As will be understood, although described as being relevant to X-ray scans, other types of scanning may be used, such as computerized tomography (CT). As will be further understood, as data sets from scans may be large, such data sets may be stored on a cloud-based computer system.

In embodiments, the value of this method compared to conventional analysis is in the quality of the three-dimensional image results, with increased signal over noise ratio, and in the precision in the fiber/wire identification. The obtained results demonstrate that merging the data facilitates a comprehensive and detailed visualization of the component, specifically in terms of wires and discontinuity detection. Unmerged data show a considerably reduced level of details. This method is particularly useful when considering the limited X-Ray source power.

To demonstrate the superior quality of the data achieved through merged data, the detection of wires in the same component was applied to a single volume without performing the merge, using the same parameters as previously selected. Thus, in the FIGS. provided, the reader may identify the differences between merged and non-merged data.

Figure 6:
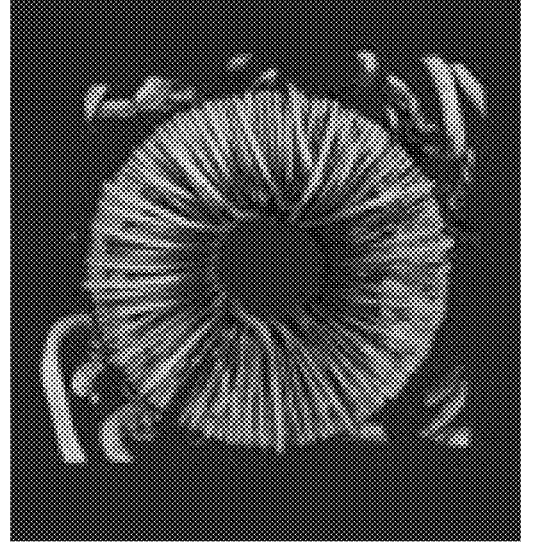
FIG. 6 is depiction of top and bottom views of the merged data sets of FIG. 4.
Figure 6:
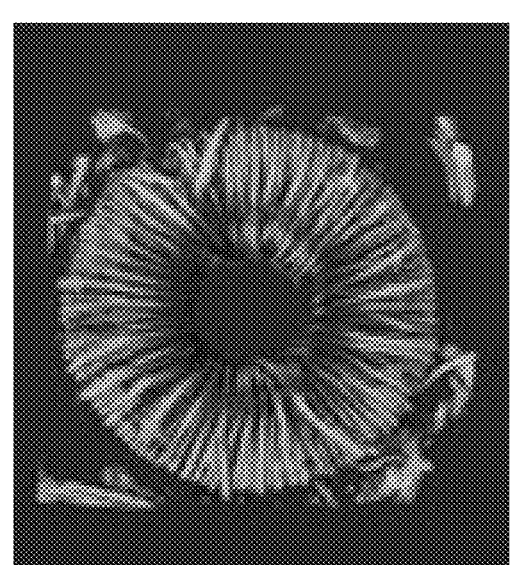
Figure 7:
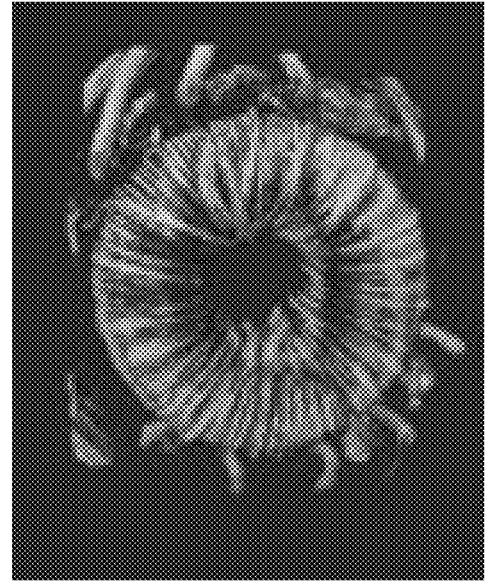
FIG. 7 is top and bottom view of a single acquisition data set for a volume set 2.
Figure 7:
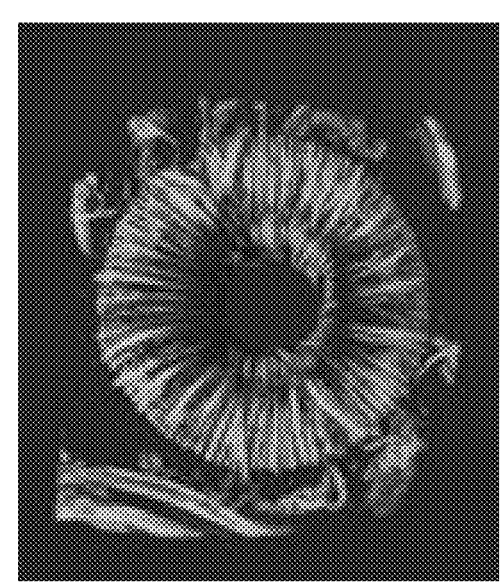

The results of this comparison are presented in the figures. Referring to FIG. 6, a first result of merged data for a first volume and a second volume is shown. The left most portion of FIG. 6 illustrates a top view and a right most portion illustrates a bottom view. Referring to FIG. 7, the left most portion illustrates a top view and a right most portion illustrates a bottom view. As can be seen, the merged data in FIG. 6 illustrates better clarity and more identification of wires that are damaged compared to the results provided in FIG. 7.

Figure 8:
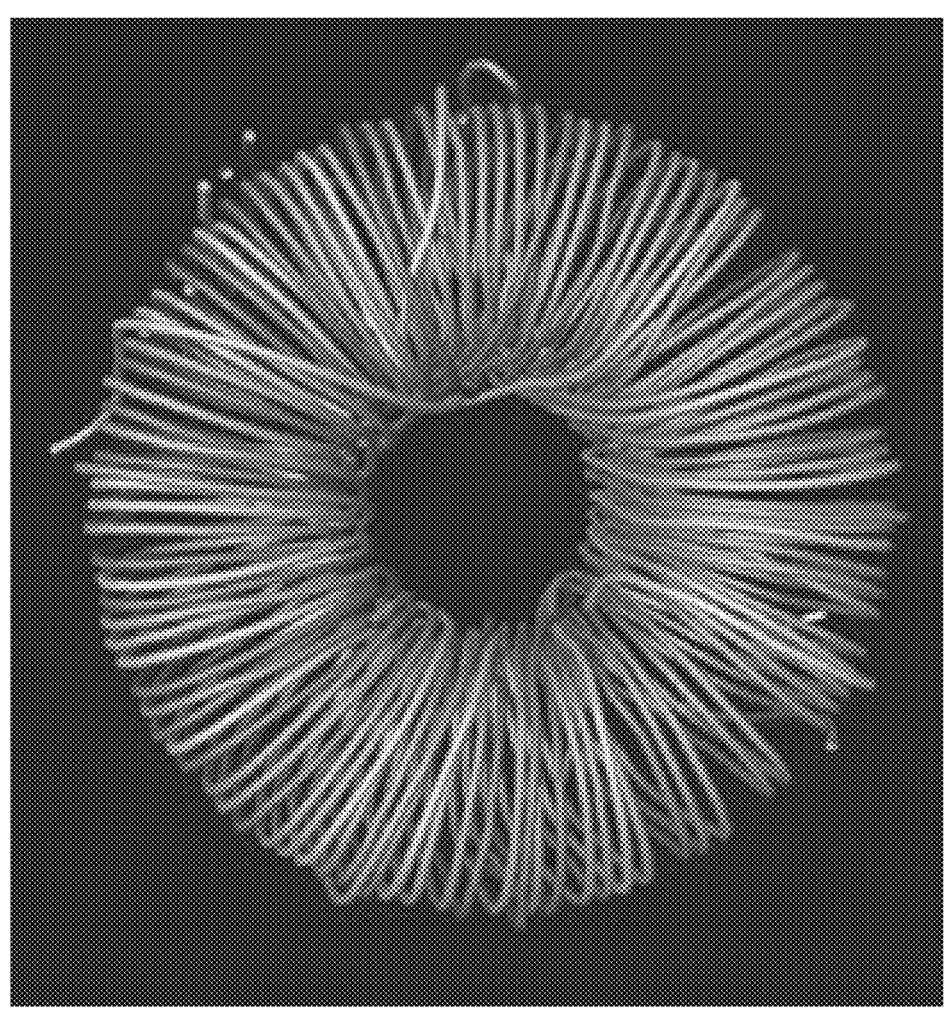
FIG. 8 is a merged top view showing twenty discontinuous identified wires.
Figure 9:
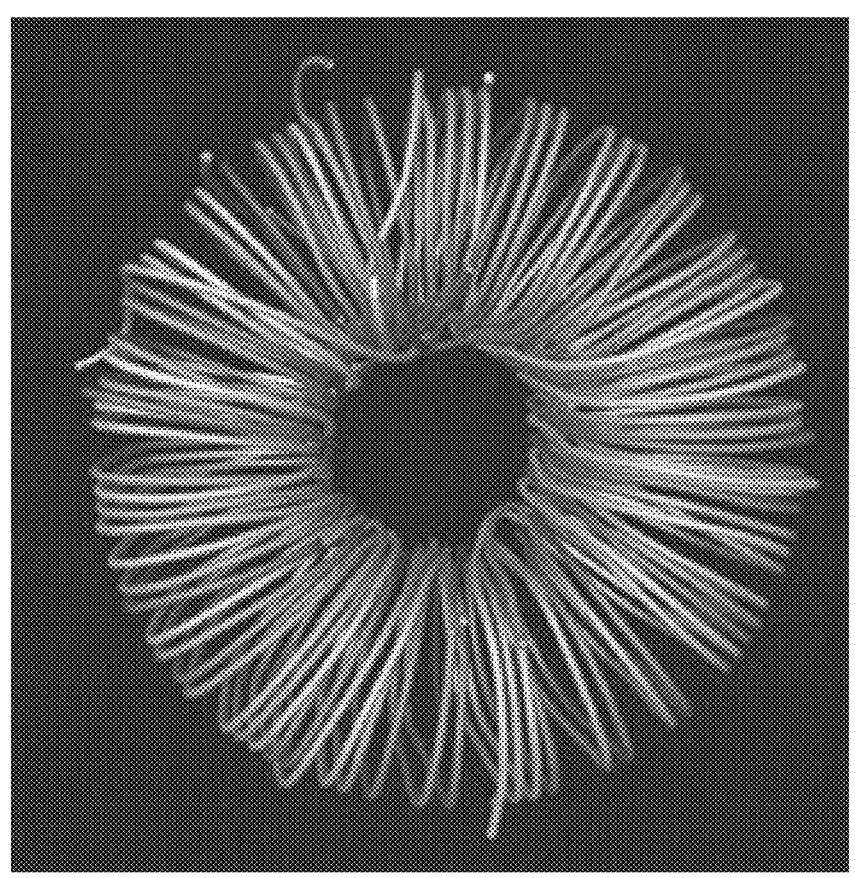
FIG. 9 is a non-merged top view showing eleven discontinuous identified wires.
Figure 10:
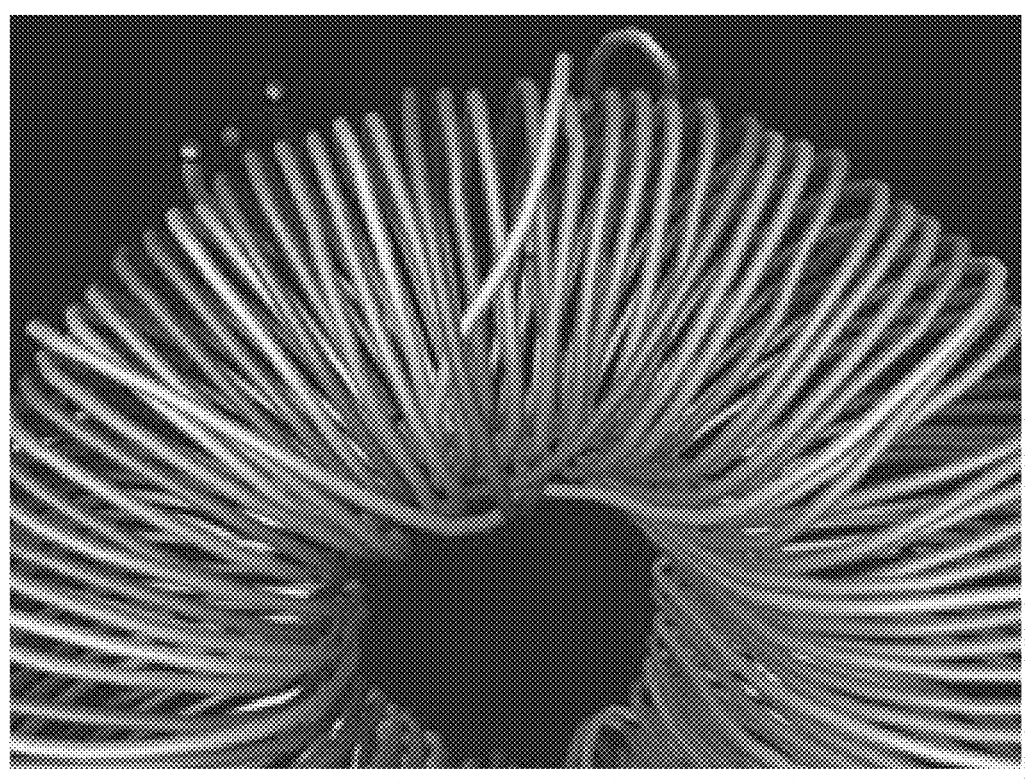
FIG. 10 is a zoomed top view of results of merged data.
Figure 11:
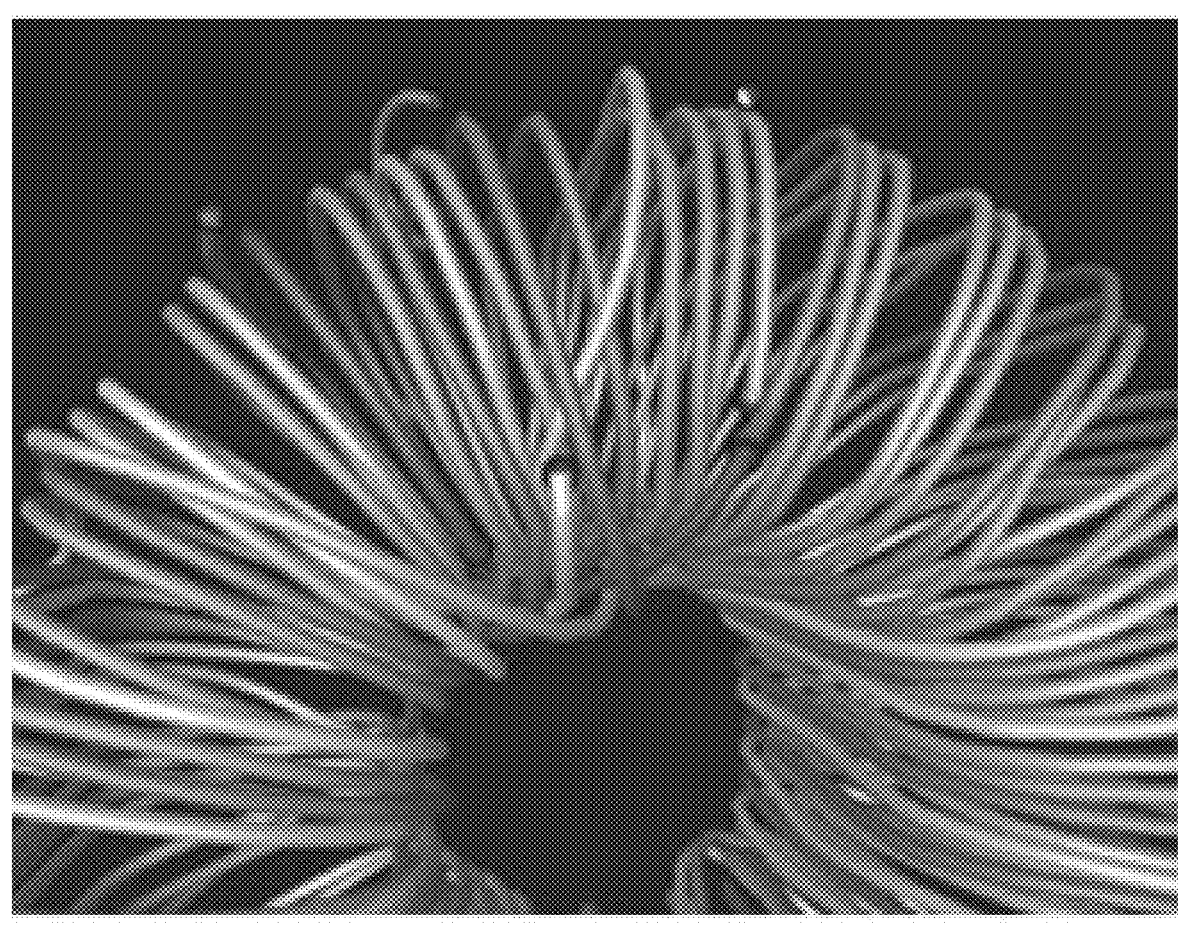
FIG. 11 is a zoomed top view of results for a single acquisition.

For further enhancement, a top comparison of the data sets is provided for review. In FIG. 8, twenty discontinuous wires are illustrated for the merged set, while in FIG. 9, only eleven discontinuous wires are illustrated. Through this method, in this one example, nine additional discontinuous wires are identified. For easier identification, FIG. 10 illustrates a zoomed view of the top of FIG. 8 illustrating discontinuous wires, while FIG. 11 illustrates a zoomed view of the top of FIG. 9 illustrating less defects. In embodiments, highlighted details of broken or compromised structures may be visually depicted for user review. As will be understood, separate warning systems may be incorporated into the analysis protocol such that if visual analysis determines a structure is free from defects, a user may then quickly move onto another analysis limiting expensive review time. In embodiments, artificial intelligence may also be used to review the data to completely eliminate user interaction or review of data. Such artificial intelligence may be created such that nodal analysis of differing layers may provide for learning capabilities for the program.

Using merged data in the analysis of complex and dense components improves the accuracy and reliability of the analyzed data (as shown here by the winding wire detection). The merged dataset captures details from multiple orientations, enabling precise identification of the component's structure and potential failures, such as wire continuity, potential short circuits, and critical characteristics. In contrast, relying on a single orientation dataset may result in limitations and incomplete information.

Figure 12:
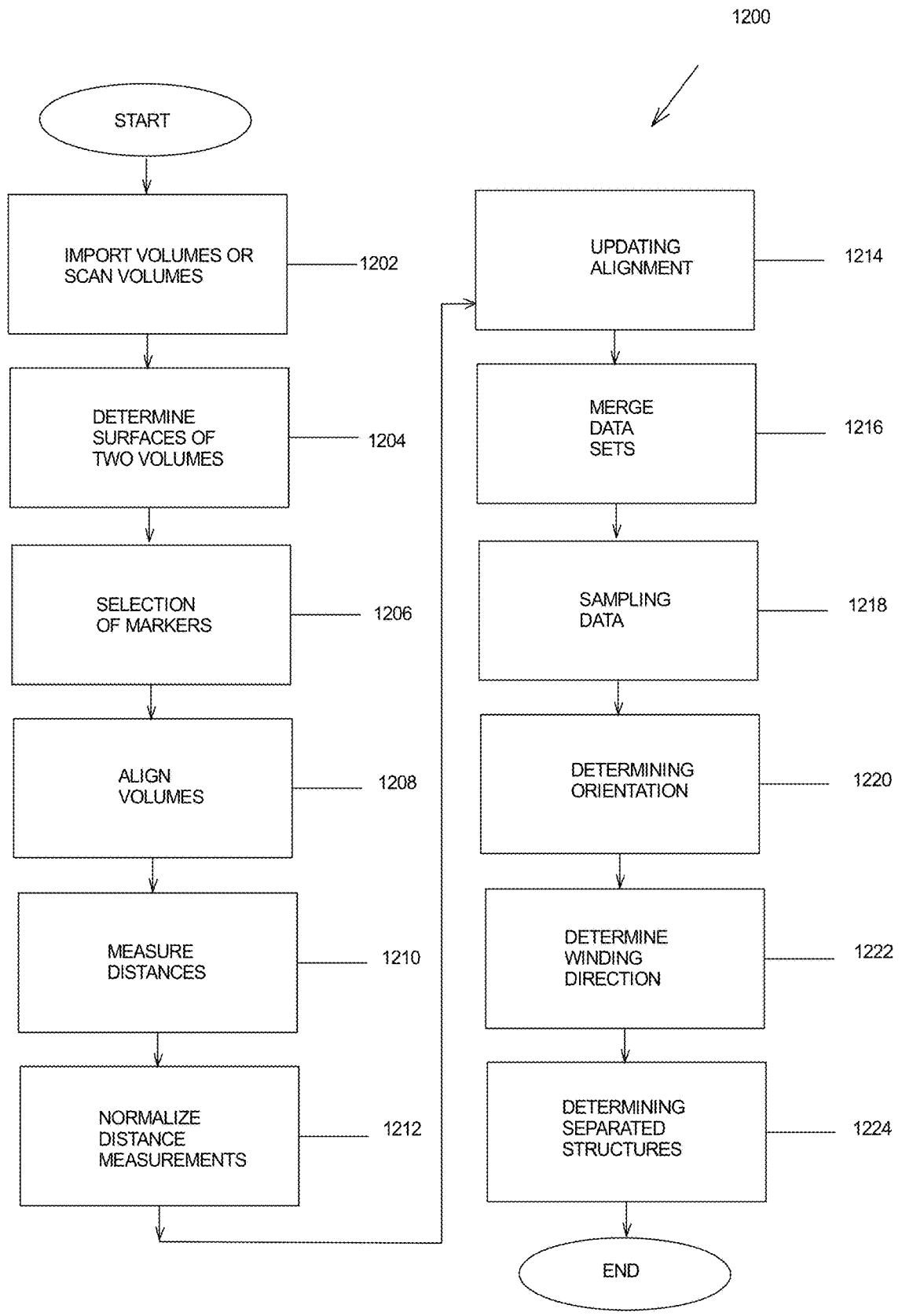
FIG. 12 is a method for performing an analysis of a three-dimensional body in accordance with one example embodiment of the disclosure.

Referring to FIG. 12, a method 1200 of using an enhanced image analysis for three-dimensional scan acquisition and fiber/wire separation is provided. At 1202, the method includes importing two volumes and reference points with perpendicular acquisition orientations, each of the two volumes and reference points having discrete data sets. As can be understood, the method may also involve actual scanning of an object from two different viewpoints and saving the data sets from the two different viewpoints onto a computer or non-volatile memory. At 1204, the method includes determining surfaces of the two volumes. At 1206, the method includes making a selection of markers on each of the two volumes. At 1208, the method includes aligning the two volumes based upon the positioning of the markers. At 1210, the method includes measuring distances between markers on each of the two volumes. At 1212, the method includes normalizing the measured distances between the markers. At 1214, the method further includes updating the aligning of the two volumes based upon the normalized measured distances between the markers and updating the data sets. At 1216, the method further includes merging the data sets to achieve a single data set. At 1218, the method further includes sampling the single data set. At 1220, the method further includes determining an orientation and correlation information of wires and plotting a position of the wires. At 1222, the method further includes determining a winding direction of the wires for the single data set. At 1224, the method further includes determining separated structures for the single set. As presented above, the method steps may be accomplished on a computer and output may be provided visually or through printed analysis. Furthermore, aspects of the disclosure may also include saving data from data sets into non-volatile memory arrangements. Such non-volatile memory arrangements may transport data for computer analysis at other computers/workstations/computing devices.

Example embodiments of the claims are presented. The embodiments should not be considered limiting. In one embodiment, a method for analysis of a three-dimensional scan is disclosed. The method may comprise importing two volumes and reference points with perpendicular acquisition orientations, each of the two volumes and reference points having discrete data sets. The method may comprise determining surfaces of the two volumes. The method may further comprise making a selection of markers on each of the two volumes. The method may comprise aligning the two volumes based upon the positioning of the markers. The method may further comprise measuring distances between markers on each of the two volumes. The method may further comprise normalizing the measured distances between the markers. The method may further comprise updating the aligning of the two volumes based upon the normalized measured distances between the markers and updating the data sets. The method may further comprise merging the data sets to achieve a single data set. The method may further comprise sampling the single data set. The method may further comprise determining an orientation and correlation information of wires and plotting a position of the wires. The method may further comprise determining a winding direction of the wires for the single data set. The method may further comprise determining separated structures for the single set.

In another example embodiment, the method may be performed wherein the markers are geometric elements.

In another example embodiment, the method may be performed wherein the making of the selection of markers are reference points for alignment.

In another example embodiment, the method may be performed wherein the updating of the aligning of the two volumes achieves a superposition of the two volumes.

In another example embodiment, the method may be performed wherein the sampling adjusts a resolution of the single data set.

In another example embodiment, the method may be performed wherein the sampling results in a higher signal to noise ratio than an original signal to noise ratio of the discrete data sets.

In another example embodiment, the method may be performed wherein the determining the orientation and correlation information of the wires and plotting the position of the wires is based on a calculation of correlation measurements and orientation values.

In another example embodiment, the method may be performed wherein the calculation of the correlation measurements and orientation values consider a radius of a cylinder of the single data set.

In another example embodiment, the method may be performed wherein the determining the winding direction of the wires for the single data set includes selecting two perpendicular scanning axes and reconstructing a final image.

In another example embodiment, the method may be performed wherein the determining separated structures for the single set is an indicator of the presence of wire failures.

In another example embodiment, the method may further comprise displaying an image of the single data set illustrating the separated structures.

In another example embodiment, an article of manufacture comprising a non-volatile memory with a set of instructions incorporated onto the non-volatile memory configured to be read by a computer. The set of instructions may include a method for analysis of a three-dimensional scan. The method on the set of instructions may comprise importing two volumes and reference points with perpendicular acquisition orientations, each of the two volumes and reference points having discrete data sets. The method on the set of instructions may comprise determining surfaces of the two volumes. The method on the set of instructions may comprise making a selection of markers on each of the two volumes. The method on the set of instructions may comprise aligning the two volumes based upon the positioning of the markers. The method on the set of instructions may comprise measuring distances between markers on each of the two volumes. The method on the set of instructions may comprise normalizing the measured distances between the markers. The method on the set of instructions may further comprise updating the aligning of the two volumes based upon the normalized measured distances between the markers and updating the data sets. The method on the set of instructions may further comprise merging the data sets to achieve a single data set. The method on the set of instructions may further comprise sampling the single data set. The method on the set of instructions may further comprise determining an orientation and correlation information of wires and plotting a position of the wires. The method on the set of instructions may further comprise determining a winding direction of the wires for the single data set. The method on the set of instructions may further comprise determining separated structures for the single set.

In another example embodiment, a method may comprise performing two three-dimensional scans of an object, each of the scans in a perpendicular acquisition orientation and each scan having discrete data sets, the scans defining two volumes. The method may also comprise determining surfaces of the two volumes. The method may also comprise making a selection of markers on each of the two volumes. The method may also comprise aligning the two volumes based upon the positioning of the markers. The method may also comprise measuring distances between markers on each of the two volumes. The method may also comprise normalizing the measured distances between the markers. The method may also comprise updating the aligning of the two volumes based upon the normalized measured distances between the markers and updating the data sets. The method may also comprise merging the data sets to achieve a single data set. The method may also comprise sampling the single data set. The method may also comprise determining an orientation and correlation information of wires and plotting a position of the wires. The method may also comprise determining a winding direction of the wires for the single data set. The method may also comprise determining separated structures for the single data set.

In another example embodiment, the method may be performed wherein the object is a winding for an electrical component.

In another example embodiment, the method may further comprise saving the single set of data pertaining to the scan of the object in a non-volatile memory.

In another example embodiment, the method may further comprise displaying an image of the single data set illustrating the separated structures.

In another example embodiment, the method may be performed wherein the updating of the aligning of the two volumes achieves a superposition of the two volumes.

In another example embodiment, the method may be performed wherein the sampling adjusts a resolution of the single data set.

In another example embodiment, the method may be performed wherein the determining the winding direction of the wires for the single data set includes selecting two perpendicular scanning axes and reconstructing a final image.

In another example embodiment, the method may be performed wherein the determining separated structures for the single set is an indicator of the presence of wire failures.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may be varied in many ways. Such variations are not to be regarded as a departure from the disclosure, and all such modifications are intended to be included within the scope of the disclosure.

While embodiments have been described herein, those skilled in the art, having benefit of this disclosure, will appreciate that other embodiments are envisioned that do not depart from the inventive scope. Accordingly, the scope of the present claims or any subsequent claims shall not be unduly limited by the description of the embodiments described herein.

What is claimed is:

1. A method for analysis of a three-dimensional scan of a wound wire around a core, comprising:

importing two volumes and reference points with perpendicular acquisition orientations, each of the two volumes and reference points having discrete data sets imaging a same wound wire and core;

determining surfaces of the two volumes;

making a selection of markers on each of the two volumes;

aligning the two volumes based upon the positioning of the markers;

measuring a first distance between markers on a first volume of the two volumes and measuring a second distance between markers on a second volume of the two volumes;

normalizing the first distance and the second distance between the markers;

updating the aligning of the two volumes based upon the normalized measured distances between the markers and updating the data sets;

merging the data sets to achieve a single data set;

sampling the single data set;

determining an orientation and correlation information of the wire and plotting a position of the wire;

determining a winding direction of the wire for the single data set;

determining separated structures for the single data set; and outputting a final image including the winding direction of the wire and the separated structures for the single data set.

2. The method according to claim 1, wherein the markers are geometric elements.

3. The method according to claim 1, wherein the making of the selection of markers are reference points for alignment.

4. The method according to claim 1, wherein the updating of the aligning of the two volumes achieves a superposition of the two volumes.

5. The method according to claim 1, wherein the sampling adjusts a resolution of the single data set.

6. The method according to claim 5, wherein the sampling results in a higher signal to noise ratio than an original signal to noise ratio of the discrete data sets.

7. The method according to claim 1, wherein the determining the orientation and correlation information of the wire and plotting the position of the wire is based on a calculation of correlation measurements and orientation values.

8. The method according to claim 7, wherein the calculation of the correlation measurements and orientation values consider a radius of a cylinder of the single data set.

9. The method according to claim 1, wherein the determining the winding direction of the wire for the single data set includes selecting two perpendicular scanning axes and reconstructing the final image.

10. The method according to claim 1, wherein the determining separated structures for the single data set is an indicator of the presence of wire failures.

11. The method according to claim 1, further comprising: displaying an image of the single data set illustrating the separated structures.

12. An article of manufacture comprising a non-volatile memory, a set of instructions incorporated onto the non-volatile memory configured to be read by a computer, the set of instructions including a method for analysis of a three-dimensional scan of a wound wire around a core, comprising:

importing two volumes and reference points with perpendicular acquisition orientations, each of the two volumes and reference points having discrete data sets imaging a same said wound wire and core;

determining surfaces of the two volumes;

making a selection of markers on each of the two volumes;

aligning the two volumes based upon the positioning of the markers;

measuring a first distance between markers on a first volume of the two volumes and measuring a second distance between markers on a second volume of the two volumes;

normalizing the first distance and the second distance between the markers;

updating the aligning of the two volumes based upon the normalized measured distances between the markers and updating the data sets;

merging the data sets to achieve a single data set;

sampling the single data set;

determining an orientation and correlation information of wires and plotting a position of the wires;

determining a winding direction of the wire for the single data set;

determining separated structures for the single data set; and outputting a final image including the winding direction of the wires and the separated structures for the single data set.

13. A method, comprising:

performing two three-dimensional scans of an object including a wound wire around a core, each of the scans in a perpendicular acquisition orientation and each scan having discrete data sets imaging a same wound wire and core, the scans defining two volumes;

determining surfaces of the two volumes;

making a selection of markers on each of the two volumes;

aligning the two volumes based upon the positioning of the markers;

measuring a first distance between markers on a first volume of the two volumes and measuring a second distance between markers on a second volume of the two volumes;

normalizing the first distance and the second distance between the markers;

updating the aligning of the two volumes based upon the normalized measured distances between the markers and updating the data sets;

merging the data sets to achieve a single data set;

sampling the single data set;

determining an orientation and correlation information of the wire and plotting a position of the wire;

determining a winding direction of the wire for the single data set; determining separated structures for the single data set; and outputting a final image including the winding direction of the wire and the separated structures for the single data set.

14. The method according to claim 13, wherein the object is a winding for an electrical component.

15. The method according to claim 13, further comprising:

saving the single data set pertaining to the scan of the object in a non-volatile memory.

16. The method according to claim 13, further comprising:

displaying the final image of the single data set illustrating the separated structures.

17. The method according to claim 13, wherein the updating of the aligning of the two volumes achieves a superposition of the two volumes.

18. The method according to claim 13, wherein the sampling adjusts a resolution of the single data set.

19. The method according to claim 13, wherein the determining the winding direction of the wire for the single data set includes selecting two perpendicular scanning axes and reconstructing a final image.

20. The method according to claim 13, wherein the determining separated structures for the single data set is an indicator of the presence of wire failures.

* * * * *